US005386348A

United States Patent [19]

O'Shaughnessey et al.

[11] Patent Number: 5,386,348

[45] Date of Patent: Jan. 31, 1995

[54] VEHICLE HEADLAMP WITH SNAP FIT BULB SHIELD

[75] Inventors: Michael E. O'Shaughnessey, Fort Wayne; Keith Chesser, Fishers, both of Ind.

[73] Assignee: General Motors Corporation, Detroit, Mich.

[21] Appl. No.: 239,805

[22] Filed: May 9, 1994

[51] Int. Cl.[6] .......... B60Q 1/04

[52] U.S. Cl. .......... 362/61; 362/343; 362/351

[58] Field of Search .......... 362/61, 80, 303, 305, 362/307, 310, 311, 351, 358, 359, 361, 343

[56] References Cited

U.S. PATENT DOCUMENTS

| | | | |
|---|---|---|---|
| 1,238,484 | 8/1917 | Benjamin | 362/309 |
| 1,245,083 | 10/1917 | Benjamin | 362/292 |
| 1,273,473 | 7/1918 | Finkelstein | 362/301 |
| 1,633,838 | 6/1927 | Zimmerman | 362/303 |
| 1,991,866 | 2/1935 | Rich | 362/80 |
| 2,556,328 | 6/1951 | Hinds | 362/309 |
| 3,833,955 | 9/1974 | Hulbert, Jr. | 9/8.3 E |
| 4,636,923 | 1/1987 | Oyama et al. | 362/80 |
| 4,725,929 | 2/1988 | Huang | 362/80 |
| 4,760,500 | 7/1988 | Peng | 362/74 |
| 4,831,506 | 5/1989 | Miyazawa | 362/284 |
| 5,067,054 | 11/1991 | Oshio et al. | 362/61 |
| 5,195,815 | 3/1993 | Watanabe et al. | 362/61 |
| 5,199,779 | 4/1993 | Sato | 362/61 |

*Primary Examiner*—Stephen F. Husar
*Attorney, Agent, or Firm*—Ernest E. Helms

[57] ABSTRACT

A vehicle headlamp assembly is provided including a bulb providing a source of illumination: a reflector housing for mounting the bulb and providing a reflector surface with a forward ledge extending therefrom; a bulb shield for restricting illumination from the bulb and including a generally tubular portion for surrounding the bulb and a leg extending therefrom, the bulb shield also having a foot to support the leg on the housing ledge; and wherein the foot has a snap fit connection with the housing ledge.

10 Claims, 2 Drawing Sheets

VEHICLE HEADLAMP WITH SNAP FIT BULB SHIELD

FIELD OF THE INVENTION

The field of the present invention is that of vehicle headlamp assemblies, especially vehicle headlamp assemblies which utilize replaceable-type bulbs.

BACKGROUND OF THE INVENTION

Many vehicular headlamp assemblies today use replaceable bulbs. In the replaceable bulb-type headlamp assembly, there is a reflector housing in which the bulb, via a bulb holder, is mounted. In order to prevent glare, certain portions of the bulb are shielded to prevent illumination from the bulb extending to certain areas of the headlamp assembly. Typically, most bulb shields are mounted to a retainer which mounts the bulb holder such as shown and described in U.S. Ser. No. 08/174,538 to Wisler et al, commonly assigned. In an alternative to the above-described headlamp assemblies, the bulb shield is connected to the reflector housing by some type of fastener.

SUMMARY OF THE INVENTION

The present invention provides a vehicle headlamp assembly as an alternative to the aforedescribed U.S. Ser. No. 08/174,538 wherein, in the present invention, the bulb shield may be fixably attached to the reflector housing without the use of fasteners, allowing for easy installment yet very secure installation.

DESCRIPTION OF THE PREFERRED EMBODIMENT

Figure 1:
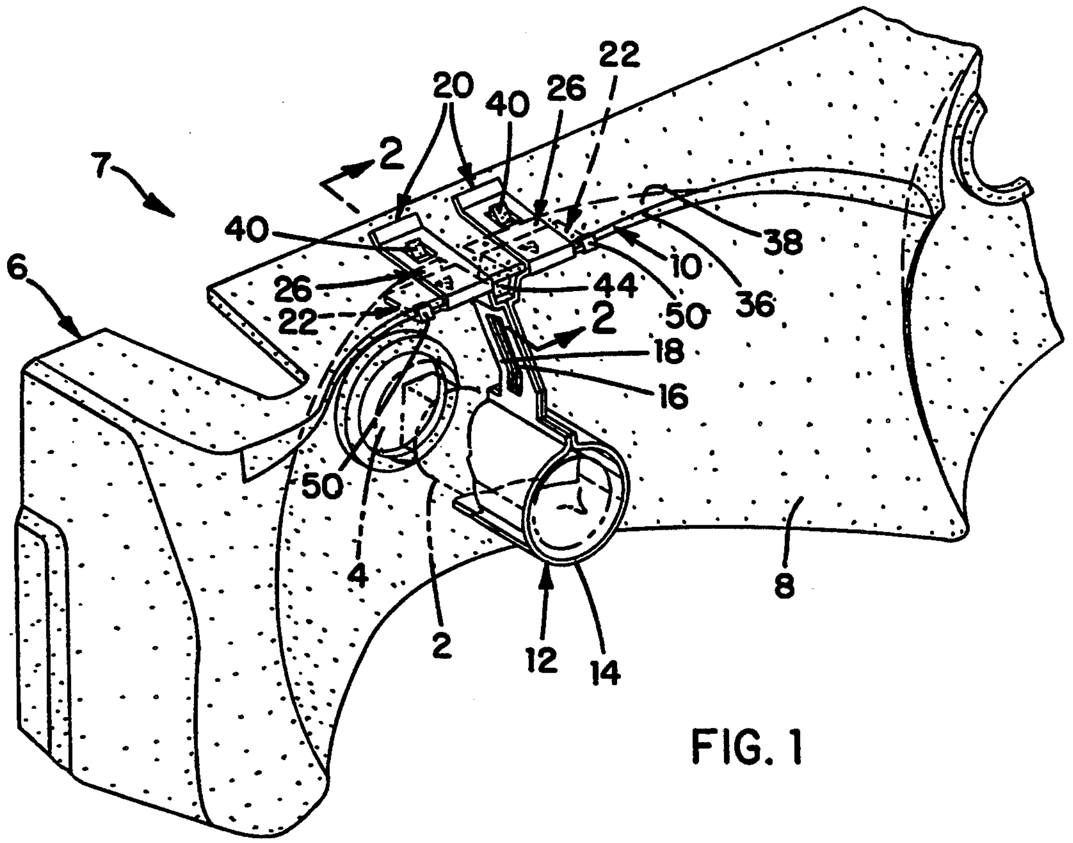
FIG. 1 is a perspective view of a preferred embodiment vehicle headlamp assembly according to the present invention with the bulb shield connected to a reflector housing.
Figure 2:
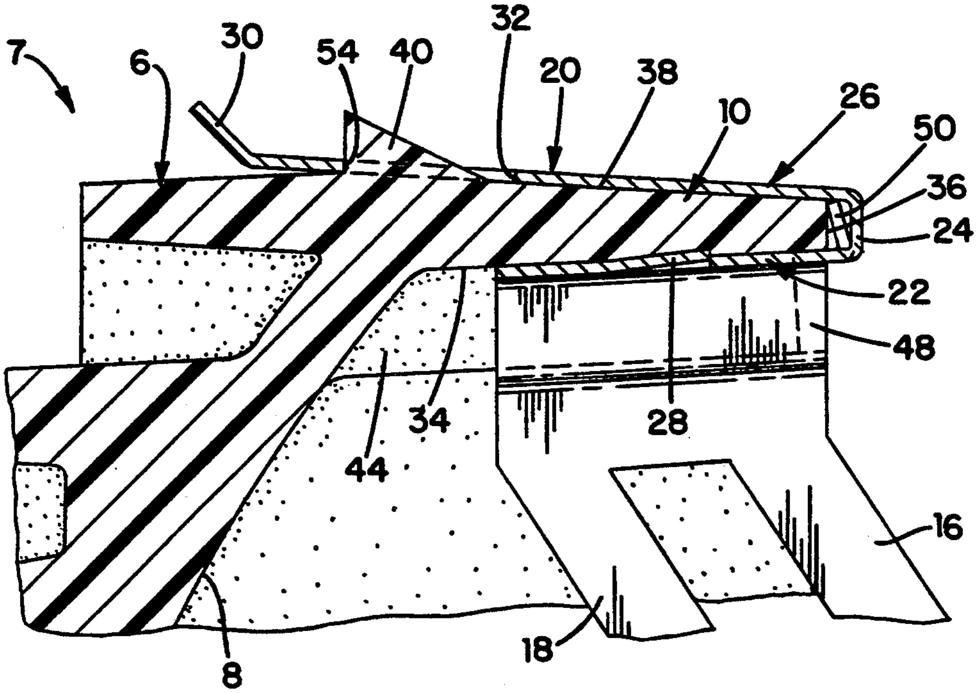
FIG. 2 is an enlarged view taken along line 2—2 of FIG. 1.
Figures 3, 4:
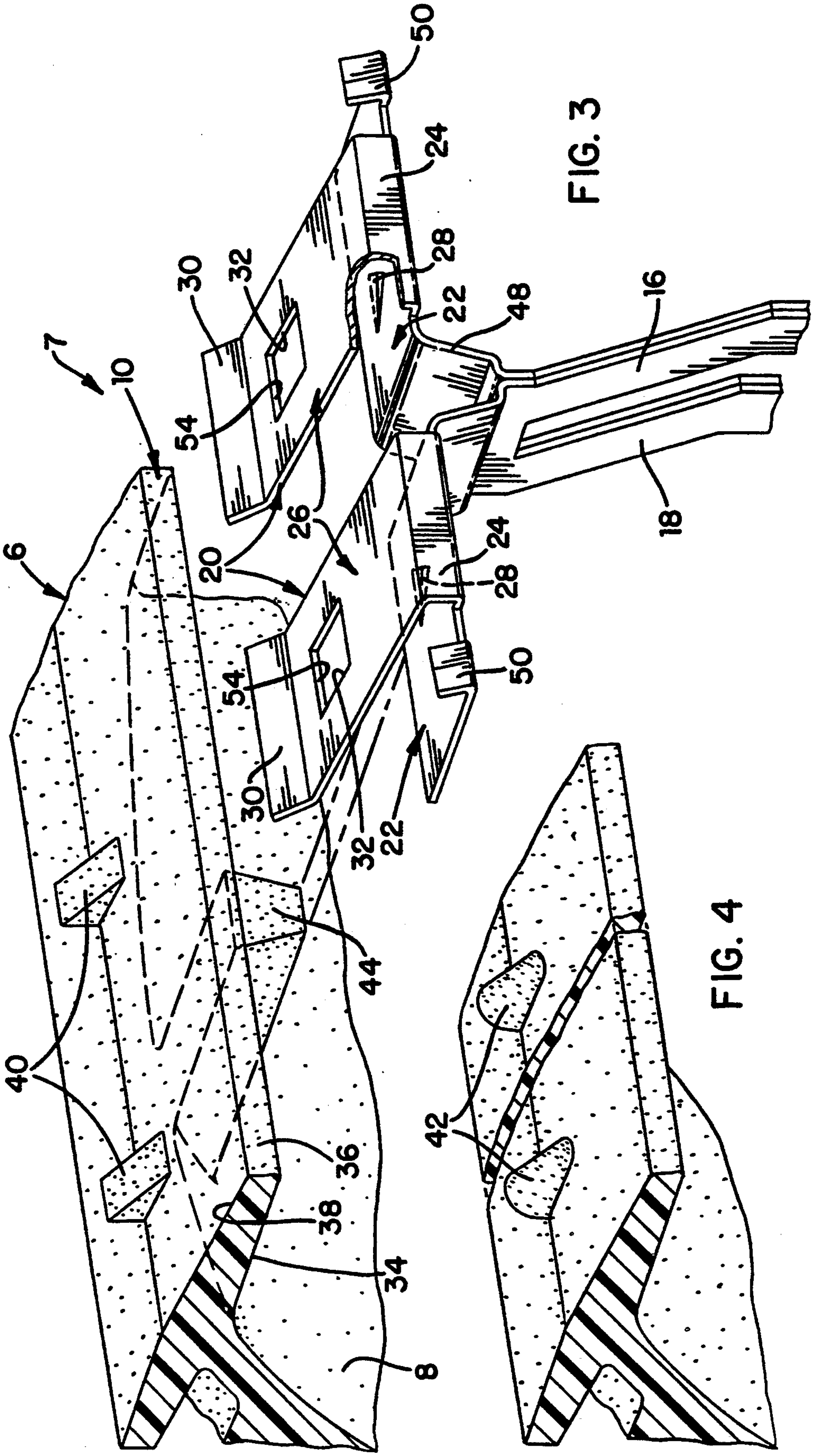
FIG. 3 is an exploded view of the headlamp assembly of FIG. 2.
FIG. 4 is a partial view of an alternative embodiment stud than that shown in FIG. 1.

Referring to FIGS. 1 through 3, the headlamp assembly 7 of the present invention has a replaceable, elongated filament bulb 2 (shown in phantom). The bulb 2 is held in a bulb holder 4 (shown in phantom). The bulb provides a source of illumination for the vehicle headlamp assembly 7, To mount the bulb holder 4, there is a reflector housing 6. The reflector housing will typically be an injectable thermoset polyester polymer material. The reflector housing 6 typically has an insertable metal retainer (not shown) which allows the bulb holder 4 to be mounted within the housing 6 by a partial rotation. The reflector housing will have a coated reflector surface 8 typically parabolic and configured in such a manner to place the bulb 2 at the focal point of the reflector surface 8. Extending forwardly from the reflector surface 8 is a wedge-shaped ledge 10 which is also integrally connected to the reflector housing 6.

As previously mentioned, to restrict the illumination of the bulb 2 to prevent the generation of glare, there is a bulb shield 12. The bulb shield is typically fabricated from a metal such as stainless steel. The bulb shield has a tubular portion 14 which generally surrounds the elongated bulb. From the tubular portion, the bulb has extending legs 16 and 18.

Connecting with the legs 16, 18 and supporting the bulb shield 12 are two feet 20 having a lower portion 22, a front wall 24 and an upper portion 26. The terms "upper" and "lower" are only recited for clarity of illustration. It will be apparent to those skilled in the art that the current invention can be utilized wherein the bulb shield would be attached to a lower ledge extending forwardly from the reflector surface, and where the terms "upper" and "lower" are utilized, other terms such as "on a side most adjacent to the tubular portion of the bulb shield" or "on a side least adjacent to the tubular portion of the bulb shield" may be substituted without departing from the spirit or scope of this invention.

The housing ledge 10 has a lower portion 34, a front wall 36 and an upper portion 38. The ledge upper portion 38 also has two laterally spaced triangular studs 40. In an alternative embodiment shown in FIG. 4, a stud 42 is generally shaped like a sliced cone. The lower portion 34 of the housing ledge has an alignment bar stud 44 generally oriented in a fore and aft direction.

Referring additionally to FIGS. 2 and 3, the lower portion 22 of the foot 20 has a stamped barb 28 which ensures that the lower portion 22 of the feet hold onto the ledge 10 if the bulb shield 12 is pulled forwardly after installation. The lower portion 22 of the foot 20 extends laterally outward to add to the stability of the bulb shield 12.

The top portion 26 of the foot has a ramp member 30 and a rectangular cut-out 32. The top portion 26 and the lower portion 22 are angled in such a manner to form a compressive interference fit with the front end of the ledge 10 which, as previously mentioned, is wedge shaped.

To install the bulb shield 12, the installer aligns a yoke portion 48 of the bulb shield with the alignment stud 44. The ramp portions 30 of the feet rice up the studs 40. Then the feet 20 will snap lockably into position with the studs 40 extending through the cut-out 32. Due to the conical surface of the stud embodiment 42 (shown in FIG. 4), it has been found to be slightly easier to push the top portion 26 of the foot over the stud 42 than over stud 40.

On the lower portion 22 of the feet 20, there are two spring tabs 50 contacting the front wall 36 of the ledge which ensures that the rear portion 54 of the rectangular cut-out in the feet contacts the rear of the studs 40. An angle that the tabs 50 make with respect to the front wall 36 can be tailored to ensure a vibration-free snug attachment of the bulb shield 12 with the reflector housing 6 without the bulb shield 12 being excessively difficult to attach.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. A vehicle headlamp assembly comprising:

a bulb providing a source of illumination;

a reflector housing for mounting the bulb, the reflector housing also providing a reflector surface and a forward ledge extending from the reflector surface;

a bulb shield for restricting the illumination given by the bulb, the bulb shield including a generally tubular portion for surrounding the bulb and a leg extending therefrom, the bulb shield also having a foot to support the leg on the housing ledge; and means for snap fit connection of the housing ledge with the bulb shield foot.

2. A headlamp assembly as described in claim 1 wherein the means of snap fit connection includes a stud projecting from the housing ledge and the foot of the bulb shield extends to upper and lower sides of the ledge and has an aperture for capturing the stud of the ledge.

3. A headlamp assembly as described in claim 2 wherein the bulb shield foot has a barb pressing against the housing ledge.

4. A headlamp assembly as described in claim 2 wherein the stud is generally shaped as a sliced cone.

5. A headlamp assembly as described in claim 1 wherein the bulb shield has two feet.

6. A headlamp assembly as described in claim 1 wherein the bulb shield has a spring member biasing the foot of the bulb shield forwardly with respect to the housing ledge.

7. A headlamp assembly as described in claim 6 wherein the spring member is at a lateral outward extreme of the bulb shield foot.

8. A headlamp assembly as described in claim 1 wherein the bulb shield foot extends on a side of the housing ledge least adjacent to the tubular portion of the bulb shield and the bulb shield foot extends on a side of the housing ledge most adjacent to the tubular portion of the bulb shield, and the bulb shield foot has an interference with the housing ledge.

9. A headlamp assembly as described in claim 8 wherein the ledge has a wedge shape.

10. A vehicle headlamp assembly comprising:

a bulb providing a source of illumination;

a reflector housing for mounting the bulb, the reflector housing also providing a reflector surface and a forward housing ledge extending from the reflector surface, the housing ledge being generally wedge shaped with upper and lower portions with a front wall in between the housing ledge also having on its upper portion two laterally spaced, sliced conical shaped studs connected therewith; and a bulb shield for restricting the illumination given by the bulb, the bulb shield including a generally tubular portion for surrounding the bulb and a leg extending therefrom, the bulb shield also having a foot to support the bulb shield on the housing ledge, the bulb shield foot having lower and upper portions to facilitate an interference fit with the housing wedge, the feet also having an aperture on a top side for snapping over the stud of the reflector housing, the feet also having at lateral outside extremes spring tabs for contacting a front end of the ledge and biasing the bulb shield forward therefrom.

* * * * *